Figures 1, 8:
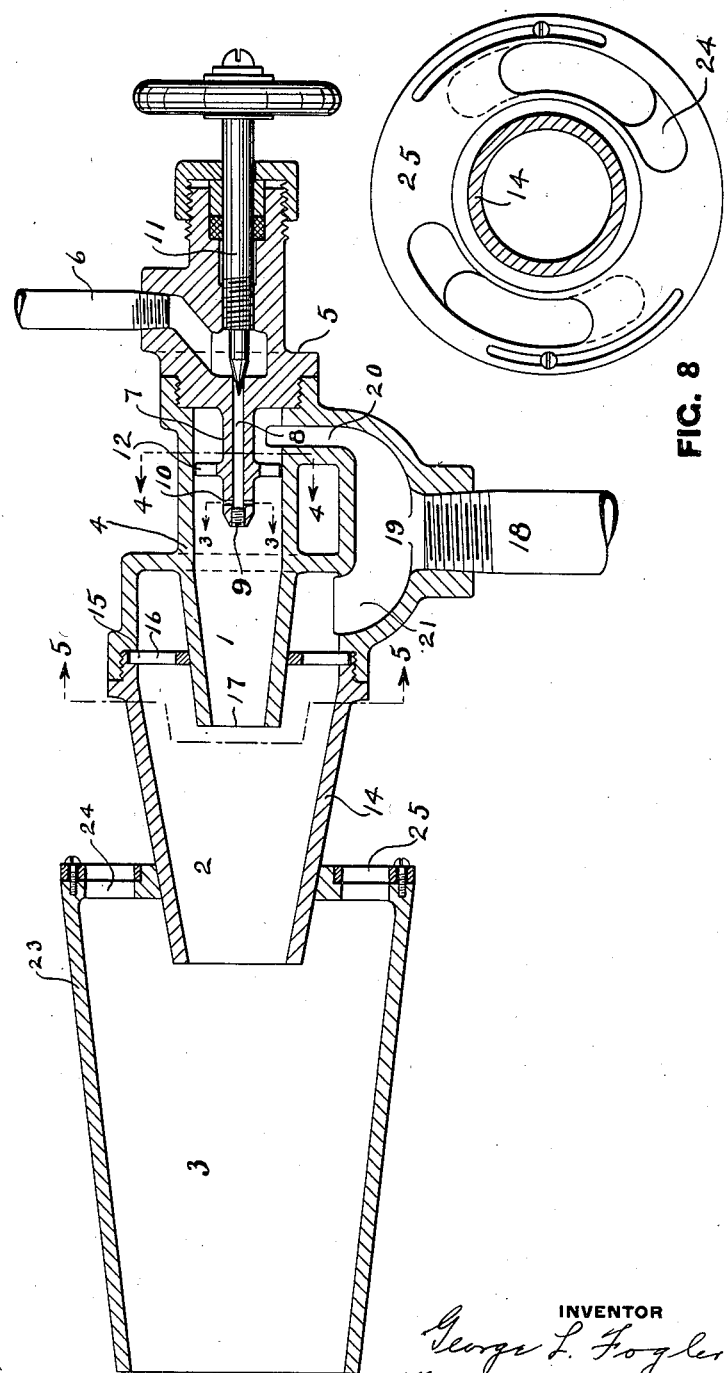

G. L. FOGLER.
FURNACE BURNER.
APPLICATION FILED MAR. 13, 1912.

1,069,243.

Patented Aug. 5, 1913.

2 SHEETS—SHEET 1.

WITNESSES

INVENTOR
George L. Fogler

G. L. FOGLER.
FURNACE BURNER.
APPLICATION FILED MAR. 13, 1912.
1,069,243.
Patented Aug. 5, 1913.
2 SHEETS—SHEET 2.
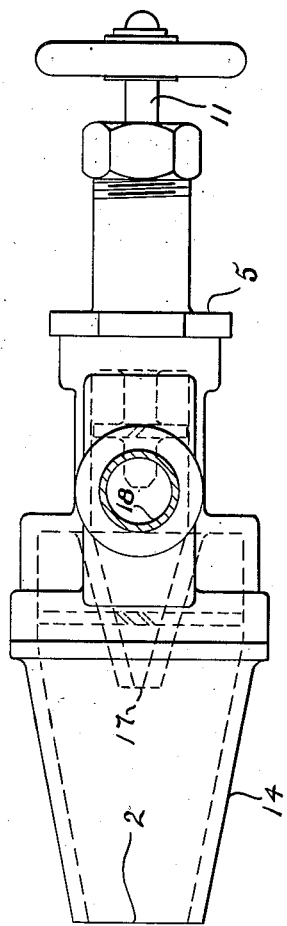
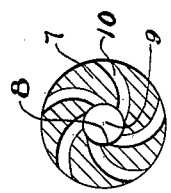
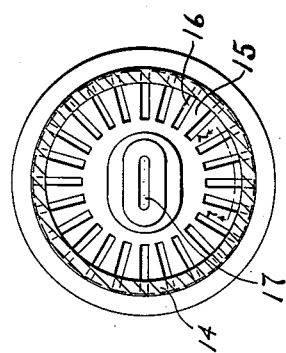
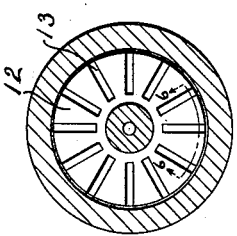
WITNESSES
INVENTOR
George L. Fogler
By Fredk W. Winter
Attorney

UNITED STATES PATENT OFFICE.

GEORGE L. FOGLER, OF PITTSBURGH, PENNSYLVANIA.

FURNACE-BURNER.

1,069,243.  Specification of Letters Patent.  Patented Aug. 5, 1913.

Application filed March 13, 1912. Serial No. 683,510.

*To all whom it may concern:*

Be it known that I, GEORGE L. FOGLER, a resident of Pittsburgh, in the county of Allegheny and State of Pennsylvania, have invented a new and useful Improvement in Furnace-Burners, of which the following is a specification.

This invention relates to oil and gas burners.
The object of the invention is to provide an improved construction for mixing and burning either oil or gas, which is of simple construction, effective in operation, and in which a thorough and complete mixture and combustion of the combustible material with air is obtained.

The invention comprises the construction and arrangement of parts hereinafter described and claimed.
In the drawings, Figure 1 is a central longitudinal section through a burner constructed according to my invention; Fig. 2 is a plan view thereof, the final combustion chamber being omitted; Fig. 3 is a cross section on the line 3—3, Fig. 1, looking in the direction of the arrows; Fig. 4 is a cross section on the line 4—4, looking in the direction of the arrows; Fig. 5 is a cross section on the line 5—5, Fig. 1, looking in the direction of the arrows; Fig. 6 is a detail cross section taken on the line 6—6, Fig. 4; Fig. 7 is a similar cross section taken on the line 7—7, Fig. 5, and Fig. 8 is an end view of the final combustion chamber from the right in Fig. 1.

The mixer and burner illustrated in the drawings may be adapted for burning either oil or other like fuel, or gas.

The essential parts of the device comprise a series of three mixing and combustion chambers, to wit, a preliminary mixing chamber 1, a further mixing and preliminary combustion chamber 2, and a final mixing and combustion chamber 3. All of these chambers are of conical form, with the entrance at the base and the discharge at the smaller end; together with proper inlets for the fuel and for air or steam for mixing therewith, and devices for securing a thorough mixture of these elements.

The preliminary mixing chamber 1 is inclosed by a suitable casing 4, to whose base or larger end is secured the fitting 5 to which the fuel supply pipe 6 is connected, said fitting 5 terminating in a nozzle 7 projecting into the chamber 1, and perforated and having communication with the supply pipe 6. The perforation 8 through the nozzle 7 does not extend to the end thereof, but said end is closed, such as by means of screw plug 9, while the bore 8 communicates with side or lateral ports 10 which may be arranged radially, but preferably are nearly tangential to the bore 8 and curved as shown in Fig. 3, so as to give a rotary or swirling motion to the oil or gas escaping from said nozzle. The passage through the fitting 5 is controlled by a needle valve 11 of the usual construction. Surrounding the nozzle 7 is a plate, wall or flange 12 provided with a series of radial slots 13 which longitudinally of the burner are inclined, as shown in Fig. 6, the direction of inclination being opposite to that of the inclination or curvature of the ports 10. The chamber 2 is inclosed within a shell 14 suitably secured to the casing 4, such as by screwing the same thereto. Clamped between the shell 14 and casing 4 is a plate or wall 15 provided with a series of radial slots 16, which longitudinally of the burner are also inclined, as shown in Fig. 7, the inclination being in a direction opposite to the inclination of the slots in plate or flange 12. The walls forming the preliminary mixing chamber 1 converge and are flattened, so as to form an elongated elliptical outlet 17, and said nozzle projects into the base of chamber 2 beyond the plate 15. The air or steam supply is through pipe 18 connected to the side of casing 4 by means of a passage 19 which branches, one branch 20 entering the chamber 1 near its base and below the plate or flange 12, while the other branch 21 enters around the nozzle 17 but below the plate 15. The passage 21 is larger in cross section than the passage 20, so that the amount of air supplied thereby bears substantially the same ratio to the amount of mixed fuel and air passing through nozzle 17 as the amount of air supplied by passage 20 bears to the fuel supplied by nozzle 7, thereby causing the pressure and velocity of the mixed fuel and air to be substantially the same inside the end of the nozzle 17 as it is in the base of chamber 2 around the outside of the nozzle 17. Since the feed of the fuel to the burner depends to some extent upon the injector action of the air on the nozzle 7, the balancing of pressure in the nozzle 17 and chamber 2 will exist whatever may be the total amount of air and fuel supplied by the burner. The shell 14 inclosing the chamber 2 is also of general conical form and its inner end projects into the base of a conical shell 23 inclosing the final combustion chamber 3. The base of the shell 23 is provided with openings 24 and with a rotary regulating valve or damper 25 of the usual construction for regulating the size of the inlets to the shell 3. The air or steam entering through pipe 18 is preferably under substantial pressure, the degree of which may be regulated according to the particular use of the burner. If the fuel is a gas it also may be under pressure, but if it is in the form of a liquid it can be supplied either by the pressure due to gravity or head, or under forced pressure, the needle valve 11 in both instances controlling the supply. When gaseous fuel is used, the mixing chamber 1 is made of somewhat larger diameter (in a device of the same size) than when liquid fuel is used, but in other particulars the mixer and burner will remain unchanged.

The fuel entering the chamber 1 through the lateral ports 10 in nozzle 7 is given a whirling movement, while the air or steam entering through passage 20 has imparted to it and by the inclined slots 13 in plate or flange 12 a whirling motion in the opposite direction. If the ports 10 are radial instead of tangential the effect is not so pronounced but as the amount of air or steam is greater than that of the fuel the jets of fuel impinge upon the stream of whirling air or steam and produce a good mixture of air or steam and fuel at this point, which mixture is improved as the air or steam and fuel pass along the mixing chamber 1. At the end of chamber 1 the mixture is met by a second and larger stream of air or steam entering through passage 21 and given a whirling motion by the inclined slots 16 in plate 15 in a direction contrary to the direction of whirling of the mixture emerging from outlet 17 of chamber 1. The larger quantity of air or steam admitted through passage 21 is such that it practically balances the pressure of the smaller amount entering through passage 20, so that there is practically an equalization of pressures at the end of mixing chamber 1. By having the two streams swirling in opposite directions a very intimate mixture is produced, and this is increased from the fact that the stream issuing from chamber 1 is in the form of a wide flat stream. The flame burns back to the mouth or outlet 17 of chamber 1, and the chamber 2 therefore is not only a second mixing chamber but a preliminary combustion chamber. The flame passes out of the mouth of chamber 2 into chamber 3, where finally a complete combustion takes place, with a further admixture of air through the ports 24 if further air is necessary.

Variations in the form and proportions of my improved burner will readily suggest themselves and are to be understood as within the scope of the invention. The burner may be used to supply heat for any desired purpose. It may be supported with its axis horizontal, vertical or at an angle and may point either upwardly or downwardly. For example, it may be supported in such manner as to direct a stream of exceedingly hot gases downwardly into a ladle of molten metal to keep the same hot, or with proper supporting means one or more of the burners may supply the heat for a specially constructed Siemens-Martin furnace.

What I claim is:

1. A mixer for an oil or gas burner, comprising a casing having a mixing chamber therein and provided with an air inlet through its side wall, a fitting threaded into one end of said casing outwardly beyond said air inlet and carrying a tubular nozzle forming a fuel inlet and projecting into said chamber beyond said air inlet, and a wall or plate in said chamber between said air and fuel inlets and having inclined apertures for causing whirling movement of the entering air, said tubular fuel nozzle having inclined lateral ports therethrough arranged on an incline opposite to the incline of the apertures in said wall or plate.

2. A gas or oil burner comprising a main body having a mixing chamber therein, a second chamber secured to one end of said body and into which said mixing chamber projects, an air inlet to the base of said mixing chamber, an air inlet to the base of said second chamber, a fuel inlet to said mixing chamber, said fuel inlet comprising a nozzle having lateral ports therein, and a wall or plate supported in said second chamber in advance of the air inlet thereto, and having inclined apertures therein.

3. A mixer and burner for oil or gas comprising a main body having a mixing chamber therein, a second chamber secured to one end of said body and into which said mixing chamber projects, an inlet to the base of said mixing chamber, an inlet to the base of said second chamber, a fuel inlet to said mixing chamber, said fuel inlet comprising a nozzle having lateral ports therein, a wall or plate supported in said second chamber in advance of the air inlet thereto and having inclined apertures therein, and means for supplying air at the same pressure to said inlets to said chambers.

4. In a burner, a casing having a mixing chamber therein, a second casing secured to one end of said mixing chamber casing and with which said mixing chamber communicates, said mixing chamber casing being formed to provide connected air conduits one leading into said mixing chamber and the other communicating with said second casing, and a fitting threaded into the other end of said mixing chamber casing and carrying a fuel inlet nozzle projecting into said mixing chamber beyond the air inlet thereto, and means in said mixing chamber casing between said air and fuel inlets for causing whirling movement of the entering air.

5. In a burner, a casing having a mixing chamber therein, a second casing secured to one end of said mixing chamber casing and into which said mixing chamber leads, said mixing chamber casing being formed to provide connected air conduits leading into said mixing chamber and said second casing, a fitting threaded into the other end of said mixing chamber casing and carrying a fuel inlet nozzle projecting into said mixing chamber beyond the air inlet thereto, and plates or walls supported in said casings in advance of the air inlets thereto and having oppositely inclined apertures for causing whirling movement of the air passing therethrough.

6. An air and gas mixer, comprising a pair of chambers, one leading into the other, an air inlet to the base of each chamber, walls or plates supported in said chambers and having inclined apertures therein, the apertures in said walls or plates being opposite in direction to each other, and a fuel inlet to one of said chambers.

7. An air and gas mixer, comprising a pair of chambers, one leading into the other, an air inlet to the base of each chamber, walls or plates supported in said chambers and having inclined apertures therein, the apertures in one wall or plate being opposite in direction to those of the other, and a fuel inlet to one of said chambers, comprising a nozzle projecting into said chamber in advance of the air inlet thereto.

8. An air and gas mixer, comprising a pair of chambers, one leading into the other, an air inlet to the base of each chamber, walls or plates supported in said chambers and having inclined apertures therein, the apertures in one wall or plate being opposite in direction to those of the other, and a fuel inlet to one of said chambers, comprising a nozzle projecting into said chamber in advance of the air inlet thereto, and having a bore and lateral ports therethrough.

9. An air and gas mixer, comprising a pair of chambers, one leading into the other, an air inlet to the base of each chamber, walls or plates supported in said chambers and having inclined apertures therein, the apertures in one wall or plate being opposite in direction to those of the other, and a fuel inlet to one of said chambers, comprising a nozzle projecting into said chamber in advance of the air inlet thereto and having a bore and lateral ports therethrough, said nozzle supporting one of said walls or plates.

10. In a burner, a casing having a preliminary mixing chamber therein, a fuel inlet to said mixing chamber comprising a nozzle projecting thereinto and having inclined lateral ports and a bore, said mixing chamber being restricted at its forward end, a secondary mixing chamber into which said mixing chamber extends, and air inlets arranged to supply air under common pressure to said preliminary and secondary mixing chambers, the inlet to said preliminary chamber being smaller than the inlet to said second chamber.

11. A combined fuel mixer and burner comprising a pair of connected chambers one leading into the other, an air inlet having branches, one branch leading to each of said chambers, a fuel inlet to one of said chambers, and walls having inclined slots supported in said chambers and arranged to cause whirling of the air passing therethrough.

In testimony whereof, I have hereunto set my hand.

GEORGE L. FOGLER.

Witnesses:
ELBERT L. HYDE,
MARY E. CAHOON.